(12) United States Patent
Nguyen et al.

(10) Patent No.: US 11,351,626 B2
(45) Date of Patent: Jun. 7, 2022

(54) SPOT-WELDING SYSTEM

(71) Applicant: FANUC CORPORATION, Yamanashi (JP)

(72) Inventors: Vanbac Nguyen, Yamanashi (JP); Shigeo Yoshida, Yamanashi (JP); Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 284 days.

(21) Appl. No.: 16/844,344

(22) Filed: Apr. 9, 2020

(65) Prior Publication Data

US 2020/0376588 A1 Dec. 3, 2020

(30) Foreign Application Priority Data

May 31, 2019 (JP) .............................. JP2019-102777

(51) Int. Cl.
*B23K 11/31* (2006.01)
*B23K 11/25* (2006.01)
*B23K 11/11* (2006.01)

(52) U.S. Cl.
CPC ............. *B23K 11/314* (2013.01); *B23K 11/11* (2013.01); *B23K 11/255* (2013.01)

(58) Field of Classification Search
CPC ..... B23K 11/11; B23K 11/115; B23K 11/255; B23K 11/314; B23K 11/315; B23K 9/007
USPC .......................................................... 219/89
See application file for complete search history.

(56) References Cited

U.S. PATENT DOCUMENTS

| 9,266,187 | B2 * | 2/2016 | Cohen | B23K 11/257 |
| 9,808,934 | B2 * | 11/2017 | Oyama | B25J 9/1674 |
| 10,603,798 | B2 * | 3/2020 | Fujita | B25J 9/1676 |
| 2016/0129525 | A1 | 5/2016 | Aoki | |

FOREIGN PATENT DOCUMENTS

JP  H09-033369 A  2/1997
JP  2016-087663 A  5/2016

* cited by examiner

*Primary Examiner* — Dana Ross
*Assistant Examiner* — James F Sims, III
(74) *Attorney, Agent, or Firm* — Maier & Maier, PLLC

(57) ABSTRACT

A spot-welding system including a spot-welding gun including a movable part including a movable electrode, and a drive part that drives the movable part, a controller that controls the drive part, an applied pressure sensor that measures an applied pressure from the movable electrode of the spot-welding gun, and an own-weight calculator that calculates an own weight of the movable part based on the applied pressure detected by the applied pressure sensor in two different postures of the spot-welding gun that places the movable electrode in different movement directions. The controller superimposes a dither signal onto a control signal so as to control the drive part in measuring the applied pressure for use in calculating the own weight of the movable part by the own-weight calculator, and after the own weight is calculated, the controller corrects the control signal based on the calculated own weight.

4 Claims, 5 Drawing Sheets

SPOT-WELDING SYSTEM

CROSS-REFERENCE TO RELATED APPLICATIONS

This application claims the benefit of Japanese Patent Application No. 2019-102777, the content of which is incorporated herein by reference.

FIELD

The present disclosure relates to a spot-welding system.

BACKGROUND

There is known a spot-welding system that, when a spot-welding gun is rotated as much as an angle θ from a first posture, calculates a change amount δ between an applied pressure measured in the first posture and an applied pressure measured in a posture at the angle θ, and stores a correlation between the change amount δ and the angle θ (e.g., see Japanese Unexamined Patent Application, Publication No. 2016-87663).

When the posture of the spot-welding gun is changed, the change amount δ stored corresponding to the angle θ in the posture is read to correct an applied pressure command, so that spot-welding can be performed at a uniform applied pressure irrespective of the posture of the spot-welding gun.

SUMMARY

An aspect of the present disclosure is a spot-welding system including a spot-welding gun including a movable part including a movable electrode, and a drive part that drives the movable part, a controller that controls the drive part, an applied pressure sensor that measures an applied pressure from the movable electrode of the spot-welding gun, and an own-weight calculator that calculates an own weight of the movable part based on the applied pressure detected by the applied pressure sensor in two different postures of the spot-welding gun that places the movable electrode in different movement directions, wherein the controller superimposes a dither signal onto a control signal so as to control the drive part in measuring the applied pressure for use in calculating the own weight of the movable part by the own-weight calculator, and after the own weight is calculated, the controller corrects the control signal based on the calculated own weight.

DETAILED DESCRIPTION

Hereinafter, description will be made as to a spot-welding system 1 according to an embodiment of the present disclosure with reference to the drawings.

The spot-welding system 1 according to the present embodiment includes a spot-welding gun 2, a robot 3 to which the spot-welding gun 2 is attached, a control device (a controller) 4 connected to the robot 3, and an applied pressure sensor 5 that measures an applied pressure from the spot-welding gun 2.

Figure 1:
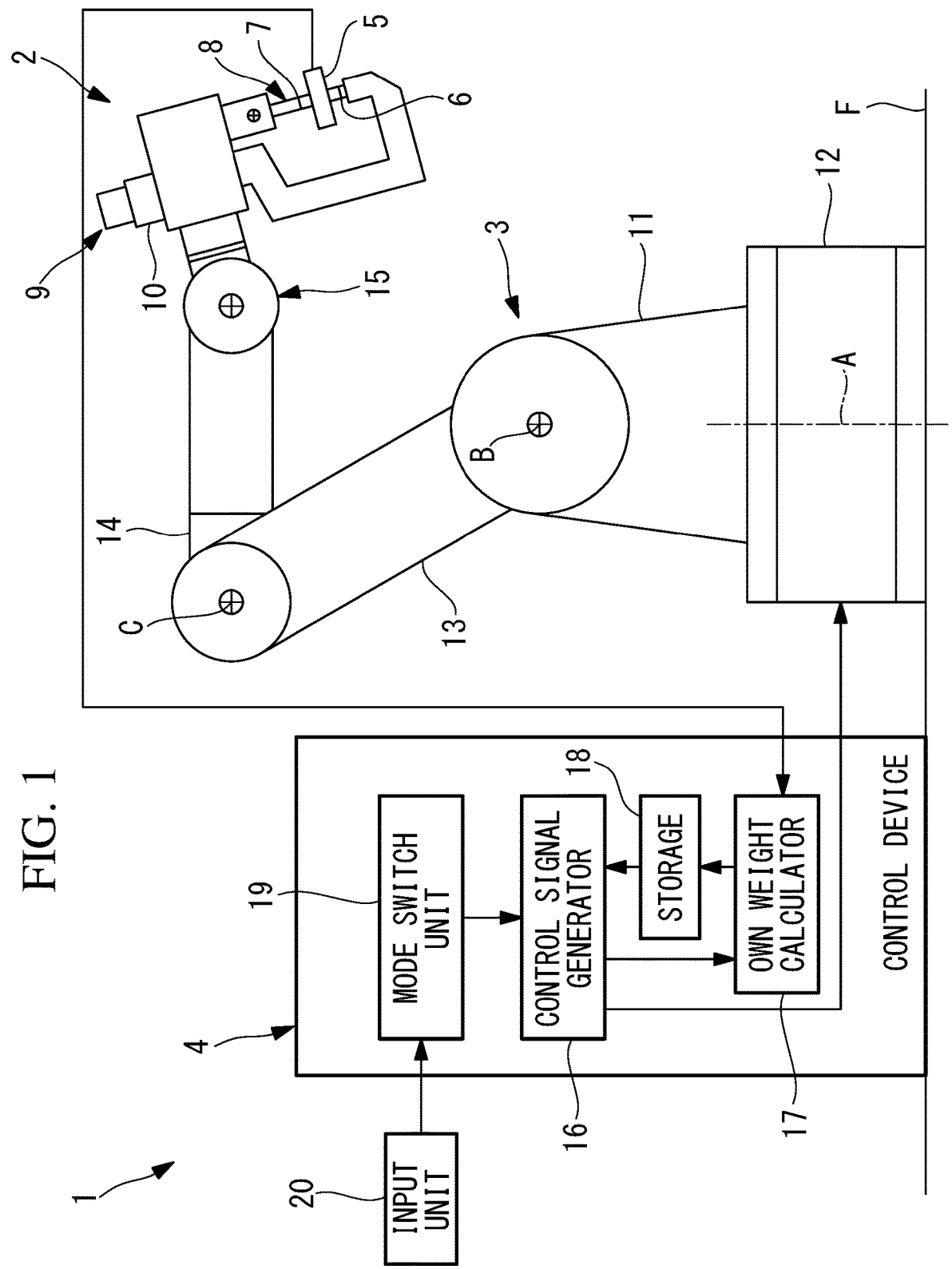
FIG. 1 is an entire configuration view showing a spot-welding system according to an embodiment of the present disclosure.

For example, as shown in FIG. 1, the spot-welding gun 2 includes a fixed welding chip 6, a movable welding chip (a movable electrode) 7, and a drive part 9 that drives a movable part 8 including the movable welding chip 7 in an uniaxial direction, and has an almost C-shape as a whole.

The spot-welding gun 2 is a servo gun, and the drive part 9 includes a servo motor 10, an unshown ball screw to be rotated by a drive force of the servo motor 10, and an unshown nut engaged with the ball screw and fixed to the movable part 8.

The spot-welding gun 2 drives the servo motor 10 to move the movable welding chip 7, opens and closes a gap between the fixed welding chip 6 and the movable welding chip 7, and holds and pressurizes a workpiece between the chip 6 and the chip 7. In this state, a current is applied across the opposite chips 6 and 7, to spot weld the workpiece.

The robot 3 is, for example, a 6-axis articulated type robot. As shown in FIG. 1, the robot 3 includes a base 11 installed on a floor surface F, and a rotary barrel 12 rotatable about a vertical first axis A to the base 11. Furthermore, the robot 3 includes a first arm 13 rotatable about a horizontal second axis B to the rotary barrel 12, a second arm 14 rotatable about a third axis C parallel to the second axis B at a tip of the first arm 13 and a 3-axis wrist unit 15 supported at a tip of the second arm 14.

The spot-welding gun 2 is attached to a tip of the wrist unit 15 of the robot 3, so that a position and a posture of the spot-welding gun 2 can be arbitrarily changed by an operation of the robot 3.

The control device 4 includes a control signal generator 16 that controls the robot 3 and also controls the servo motor 10 of the spot-welding gun 2 as an additional shaft.

Furthermore, the control device 4 includes an own weight calculator 17 that calculates an own weight of the movable part 8 of the spot-welding gun 2 based on an output from the applied pressure sensor 5 and angle information of each axis of the wrist unit 15 from the control signal generator 16, and a storage 18 that stores the calculated own weight.

The applied pressure sensor 5 is disposed at a position held between the fixed welding chip 6 and the movable welding chip 7 during own weight measuring, and measures an applied pressure from the opposite chips 6, 7 by an operation of the drive part 9.

Specifically, the control device 4 includes a mode switch unit 19 that switches an own weight measuring mode and a usual operation mode that are selectable by a user. The mode is selected, for example, by operating an input unit 20 such as a teach pendant or a switch of an operation board.

When the applied pressure sensor 5 is disposed between the fixed welding chip 6 and the movable welding chip 7 and the own weight measuring mode is selected by an operation of the input unit 20, the mode switch unit 19 switches the control signal generator 16 to the own weight measuring mode. In the own weight measuring mode, the control signal generator 16 generates, to the robot 3, a control signal to dispose the spot-welding gun 2 in a predetermined first posture. The control signal generated by the control signal generator 16 is input into the servo motor 10 that constitutes the drive part 9 of the spot-welding gun 2.

The control signal in this own weight measuring mode includes a dither signal superimposed onto a command signal (a reference applied pressure command: the control signal) to be supplied to the servo motor 10 of the drive part 9 in a state where the spot-welding gun 2 is disposed in a predetermined posture, for example, a posture in which the movable welding chip 7 pressurizes the workpiece vertically downward. For example, as shown in FIG. 2, the reference applied pressure command is a signal that changes as a target value X in a stepwise manner and onto which the dither signal is not superimposed.

In case where the dither signal is not superimposed, a response waveform of an actual applied pressure measured by the applied pressure sensor 5 does not reach the target value X of the reference applied pressure command due to influence of static friction, and a final value is Y<X, leaving a deviation.

Figure 3:
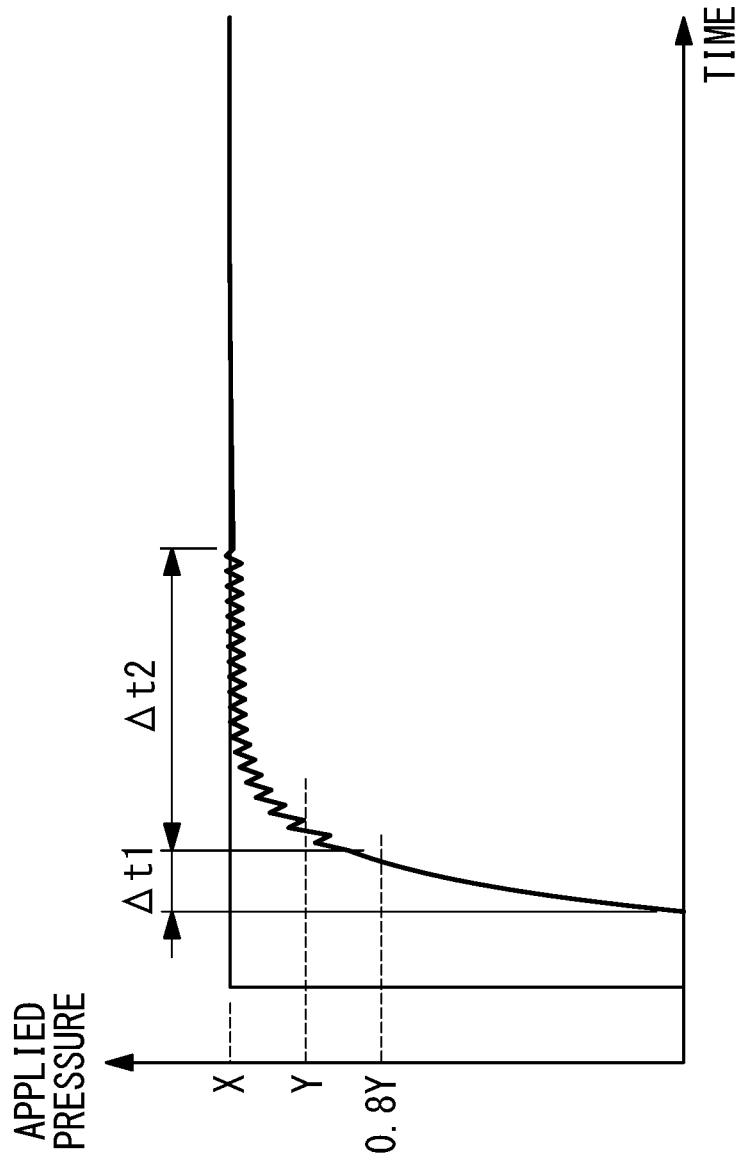
FIG. 3 is a diagram showing an example of an applied pressure command signal to be supplied to the drive part of the spot-welding gun in an own weight measuring mode of the spot-welding system of FIG. 1.

On the other hand, as shown in FIG. 3, the dither signal is superimposed onto the command signal in the own weight measuring mode. The dither signal is superimposed onto the reference applied pressure command after elapse of a predetermined time after a measured value of the applied pressure from the applied pressure sensor 5 rises.

Figure 2:
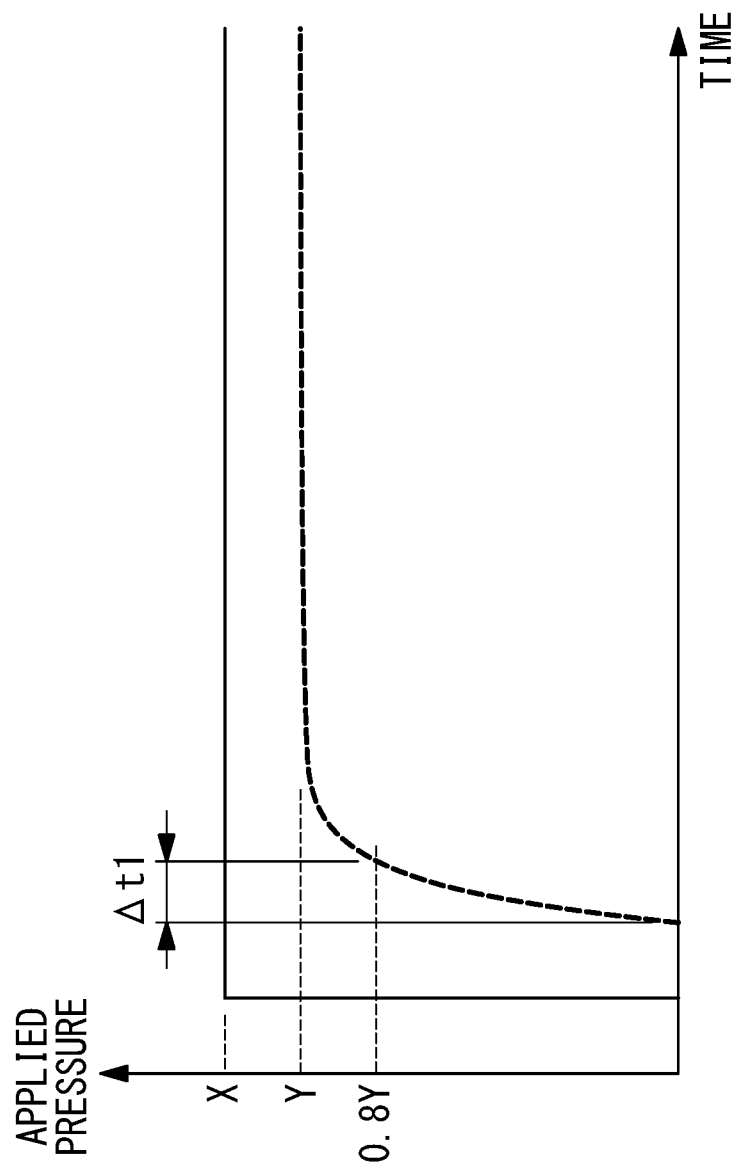
FIG. 2 is a diagram showing an example of an applied pressure command signal to be supplied to a drive part of a spot-welding gun in a usual operation mode of the spot-welding system of FIG. 1.

For example, it is preferable that the predetermined time to start superimposing the dither signal is set to time $\Delta t1$ when a value is 75% or more and less than 85%, preferably 80% of a settled applied pressure value Y in a response of the applied pressure value shown in FIG. 2 in case where the pressure is applied without superimposing the dither signal.

A periodic signal is used as the dither signal. For example, a sine wave with an amplitude A and a frequency f may be used. The amplitude A can be determined with a size of a force required to start moving the movable part 8 from a stationary state. The frequency f may be set to a frequency close to a natural frequency of the spot-welding gun 2.

Furthermore, the superimposing of the dither signal onto the reference applied pressure command is stopped at a point of time when the applied pressure detected by the applied pressure sensor 5 is settled. That is, the dither signal is superimposed onto the reference applied pressure command only for a period from $\Delta t1$ to $\Delta t2$ after the rising of the reference applied pressure command as shown in FIG. 3.

The time $\Delta t1$, $\Delta t2$ may be beforehand set based on the response waveform acquired by a preliminary experiment.

Then, the settled applied pressure value is sent from the applied pressure sensor 5 to the own weight calculator 17, and simultaneously, an angle of each axis of the wrist unit 15 is also sent to the own weight calculator 17, associated with the applied pressure value and temporarily stored.

Subsequently, the control signal generator 16 generates, to the robot 3, the control signal to dispose the spot-welding gun 2 in a predetermined second posture different from the first posture. The control signal generated in this case is a signal including the same dither signal superimposed, only for the same period, onto the same reference applied pressure command as the control signal generated in the first posture. The generated control signal is input into the servo motor 10 that constitutes the drive part 9 of the spot-welding gun 2.

The own weight calculator 17 calculates the own weight of the movable part 8 of the spot-welding gun 2 based on two sets of applied pressure values measured in two different postures of the spot-welding gun 2 and the angle of the wrist unit 15.

Figure 4:
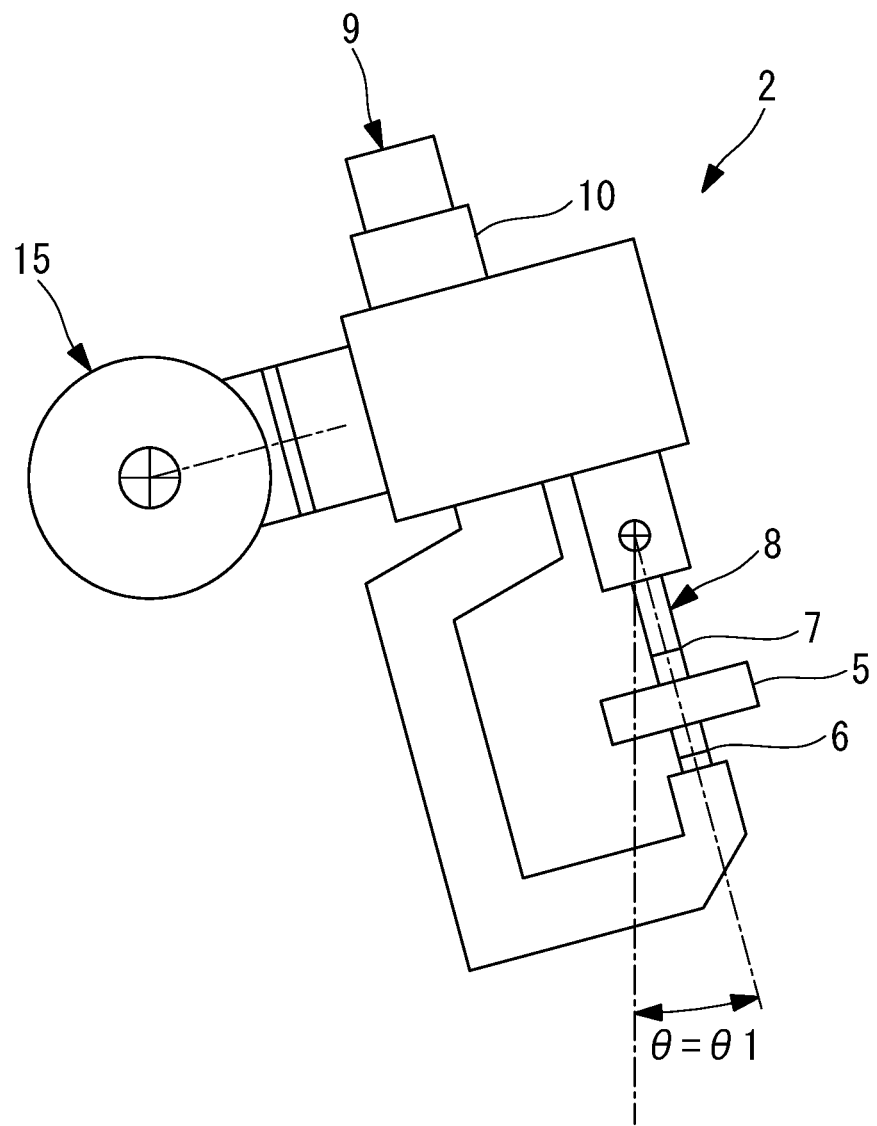
FIG. 4 is a view showing an example of a first posture of the spot-welding gun in an own weight measuring mode of FIG. 3.
Figure 5:
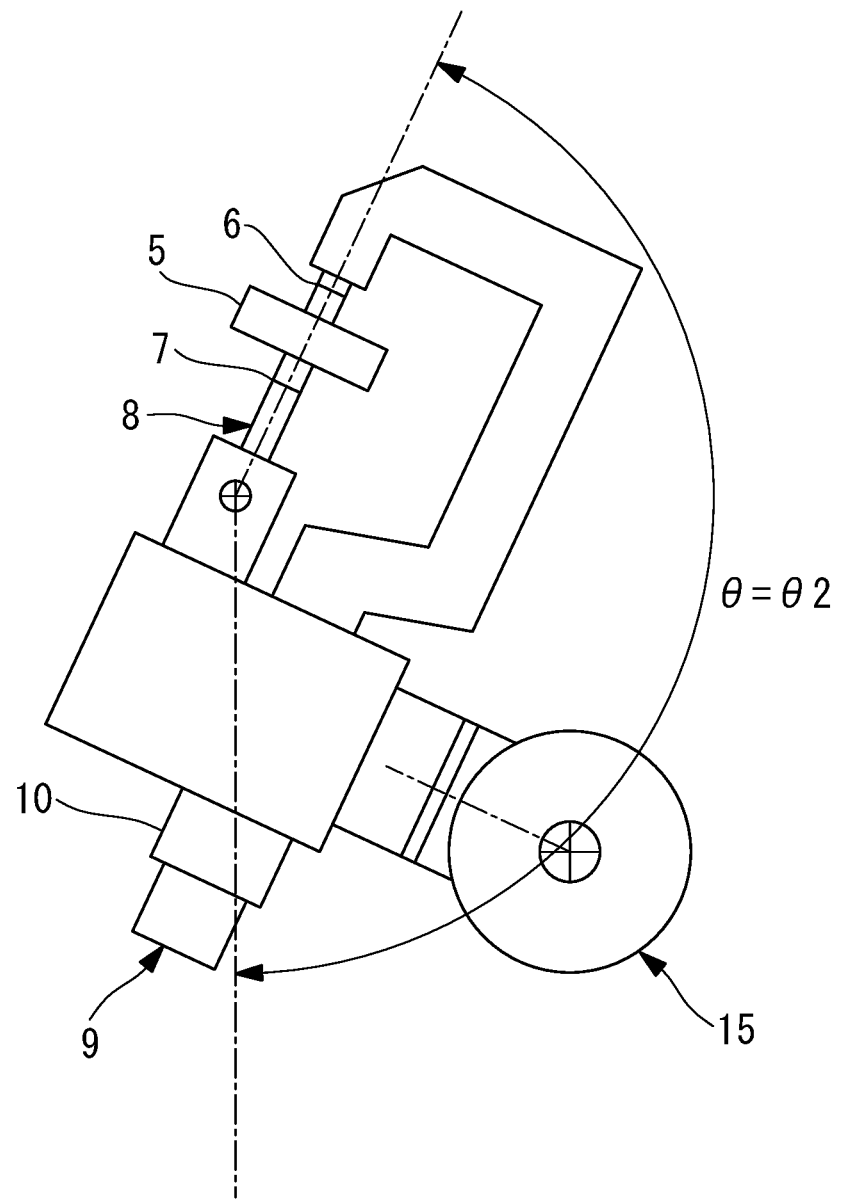
FIG. 5 is a view showing an example of a second posture of the spot-welding gun in the own weight measuring mode of FIG. 3.

For example, it is assumed as shown in FIG. 4 that the movable part 8 in the first posture moves in a vertically downward direction at an angle $\theta 1$ to a vertical plane, and an applied pressure value is F1. Furthermore, it is assumed as shown in FIG. 5 that the movable part 8 in the second posture moves in a vertically downward direction at an angle $\theta 2$ to the vertical plane, and an applied pressure value is F2.

The angles $\theta 1$, $\theta 2$ can be calculated based on the angle of each axis of the wrist unit 15. The applied pressure values F1, F2 detected by the applied pressure sensor 5 is a resultant force of an applied pressure command value Z by the drive part 9 and a component of an own weight W of the movable part 8 in the movement direction.

Therefore, relational expressions are established as follows.

$$F1 = Z + W \cos \theta 1$$

$$F2 = Z + W \cos \theta 2$$

The own weight calculator 17 calculates the own weight W of the movable part from the above relational expressions as follows.

$$W = (F1 - F2)/(\cos \theta 1 - \cos \theta 2)$$

The calculated own weight W is stored in the storage 18.

When the own weight W is stored in the storage 18 and then the usual operation mode is selected by the operation of the input unit 20, the mode switch unit 19 switches the control signal generator 16 to the usual operation mode. In the usual operation mode, the control signal generator 16 generates and outputs, to the robot 3, the control signal that follows pre-taught program, and generates, to the servo motor 10 of the drive part 9 of the spot-welding gun 2, the applied pressure command value Z corrected based on the posture of the spot-welding gun 2 at each welding point and the own weight W stored in the storage 18.

The applied pressure command value Z is corrected by the following equation.

$Z = Z0 - W \cos \theta$, in which Z0 is a desired applied pressure value, and $\theta$ is an angle from the vertically downward movement direction of the movable part 8 to the vertical plane.

The control signals generated by the control signal generator 16 are input into the robot 3 and the servo motor 10 that constitutes the drive part 9 of the spot-welding gun 2, respectively.

In the usual operation mode, the control signal to be output to the spot-welding gun 2 does not include the dither signal.

According to the spot-welding system 1 of the present embodiment including the above configuration, the own weight measuring mode is selected, and the control signal including the dither signal superimposed thereto is accordingly supplied to the drive part 9 of the spot-welding gun 2. This can reduce the influence of the static friction, and the applied pressure generated by the drive part 9 can be accurately measured. Therefore, there is an advantage that the own weight W of the movable part 8 of the spot-welding gun 2 can be accurately calculated using the accurately measured applied pressure.

Furthermore, in the present embodiment, time to superimpose the dither signal onto the applied pressure command value Z is limited to time after elapse of a predetermined time after rising of the response of the applied pressure value. Within the predetermined time after the rising, the drive part 9 is not stopped and any static friction is not generated, so that the dither signal does not have to be superimposed. Consequently, a time for which the drive part 9 is driven by the control signal including the dither signal can be shortened.

Additionally, in the present embodiment, the superimposing of the dither signal onto the applied pressure command value Z is stopped at the point of time when the applied pressure value is settled. The applied pressure value does not vary due to presence/absence of the dither signal after the applied pressure value is settled. Consequently, the dither signal is stopped, and the time for which the drive part 9 is driven by the control signal including the dither signal can be shortened to minimum.

That is, according to the present embodiment, the superimposing of the dither signal reduces the influence of the static friction, while the time to superimpose the dither signal can be minimized. Consequently, influence exerted by operating the drive part 9 with the control signal including the dither signal can be prevented in advance. An example of the influence of the operation of the drive part 9 with the control signal including the dither signal can be a problem of fretting.

Furthermore, in the present embodiment, the control signal to be supplied to the drive part 9 is corrected in accordance with the posture of the spot-welding gun 2 at each welding point by use of the accurately calculated own weight W of the movable part 8 obtained by reducing the influence of the static friction in this way. Consequently, there is an advantage that the spot welding can be performed while pressurizing all welding points with a uniform applied pressure irrespective of the own weight W of the movable part 8 and that a welding quality can be stabilized.

Note that in the present embodiment, the C-type spot-welding gun 2 has been illustrated by an example, but in place of the gun, an X-type spot welding gun or a stud welding spot welding gun may be applied.

The invention claimed is:

1. A spot-welding system comprising:
    a spot-welding gun including a movable part including a movable electrode, and a drive part that drives the movable part,
    a controller that controls the drive part,
    an applied pressure sensor that measures an applied pressure from the movable electrode of the spot-welding gun, and
    an own-weight calculator that calculates an own weight of the movable part based on the applied pressure detected by the applied pressure sensor in two different postures of the spot-welding gun that places the movable electrode in different movement directions,
    wherein the controller superimposes a dither signal onto a control signal so as to control the drive part in measuring the applied pressure for use in calculating the own weight of the movable part by the own-weight calculator, and after the own weight is calculated, the controller corrects the control signal based on the calculated own weight.

2. The spot-welding system according to claim 1, wherein the controller superimposes the dither signal onto the control signal a predetermined time after rising of the applied pressure detected by the applied pressure sensor.

3. The spot-welding system according to claim 2, wherein the predetermined time is a time until a constant ratio of an applied pressure value by the control signal onto which the dither signal is not superimposed is detected.

4. The spot-welding system according to claim 1, wherein the controller stops superimposing the dither signal at a point of time when the applied pressure detected by the applied pressure sensor is settled.

\* \* \* \* \*